United States Patent
Laskaris et al.

(10) Patent No.: US 11,484,738 B2
(45) Date of Patent: Nov. 1, 2022

(54) INTEGRATED CONTROLS FOR A FIRE SUPPRESSION SYSTEM

(71) Applicant: Hale Products, Inc., Collegeville, PA (US)

(72) Inventors: Michael A. Laskaris, Collegeville, PA (US); Alan Smith, Ocala, FL (US)

(73) Assignee: HALE PRODUCTS, INC., Collegeville, PA (US)

( * ) Notice: Subject to any disclaimer, the term of this patent is extended or adjusted under 35 U.S.C. 154(b) by 883 days.

(21) Appl. No.: 16/373,144

(22) Filed: Apr. 2, 2019

(65) Prior Publication Data
US 2019/0224508 A1    Jul. 25, 2019

Related U.S. Application Data

(62) Division of application No. 14/692,819, filed on Apr. 22, 2015, now Pat. No. 10,286,237.

(51) Int. Cl.
*A62C 5/02* (2006.01)
*A62C 35/02* (2006.01)
(Continued)

(52) U.S. Cl.
CPC ............ *A62C 5/024* (2013.01); *A62C 5/02* (2013.01); *A62C 27/00* (2013.01); *A62C 31/12* (2013.01);
(Continued)

(58) Field of Classification Search
CPC ........... A62C 5/02; A62C 5/022; A62C 5/024; A62C 27/00; A62C 31/12; A62C 35/026;
(Continued)

(56) References Cited

U.S. PATENT DOCUMENTS

2007/0209807 A1    9/2007  Kruger et al.
2009/0218110 A1    9/2009  Laskaris et al.
(Continued)

FOREIGN PATENT DOCUMENTS

EP    2116282 A1    11/2009

OTHER PUBLICATIONS

Office Action dated May 27, 2021 in EP Application No. 16165687.1.

(Continued)

*Primary Examiner* — Darren W Gorman
(74) *Attorney, Agent, or Firm* — Panitch Schwarze Belisario & Nadel LLP

(57) ABSTRACT

An integrated operator interface for a fire suppression system is provided. The fire suppression system includes an engine, a water source, a water pump, a foam system and a compressed air system. The integrated operator interface includes a control panel including a plurality of one-touch activation controls. Each one-touch activation control is configured to cause the output of a predetermined fire suppression fluid from the fire suppression system and cause a predetermined increase in engine speed resulting in an associated increase in water pump pressure. The predetermined fire suppression fluid comprising a predetermined flow of water, a predetermined type of foamant, a predetermined concentration of the predetermined type of foamant, and a predetermined flow of compressed air.

13 Claims, 15 Drawing Sheets

(51) Int. Cl.
  *G06F 3/04847* (2022.01)
  *G06F 3/0488* (2022.01)
  *A62C 27/00* (2006.01)
  *A62C 37/36* (2006.01)
  *A62C 31/12* (2006.01)

(52) U.S. Cl.
  CPC ............ *A62C 35/026* (2013.01); *A62C 37/04* (2013.01); *G06F 3/0488* (2013.01); *G06F 3/04847* (2013.01)

(58) Field of Classification Search
  CPC ............... A62C 37/04; A62C 99/0036; G06F 3/04847; G06F 3/0488
  See application file for complete search history.

(56) References Cited

U.S. PATENT DOCUMENTS

| | | | |
|---|---|---|---|
| 2009/0260836 A1* | 10/2009 | Laskaris | A62C 5/02 |
| | | | 169/14 |
| 2010/0236799 A1 | 9/2010 | Vetesnik | |
| 2013/0048318 A1 | 2/2013 | Ewers et al. | |
| 2013/0118763 A1* | 5/2013 | Pace | B01F 35/8311 |
| | | | 169/46 |
| 2013/0253711 A1 | 9/2013 | McLoughlin et al. | |

OTHER PUBLICATIONS

Extended Search Report dated Aug. 1, 2016 in EP Application No. 16165687.1.
Office Action dated Apr. 12, 2017 in U.S. Appl. No. 14/692,819, by Laskaris.
Office Action dated Oct. 4, 2017 in U.S. Appl. No. 14/692,819, by Laskaris.

* cited by examiner

INTEGRATED CONTROLS FOR A FIRE SUPPRESSION SYSTEM

CROSS-REFERENCE TO RELATED APPLICATIONS

This application is a Divisional of U.S. patent application Ser. No. 14/692,819, filed Apr. 22, 2015, the disclosure of which is incorporated herein by reference in its entirety.

BACKGROUND OF THE INVENTION

This invention generally relates to improving fire suppression systems and techniques and, more particularly, to integrated controls for a fire truck water pump and/or a drive transmission for a fire truck to reduce the occurrence of human error and to improve the efficiency of extinguishing fires.

Fortunately, over the past 20-30 years, the total number of structural fires per year has declined. However, the total number of firefighter deaths and the amount of money lost as a result of fires has not experienced the same decline. In fact, approximately the same number of firefighters die per 100,000 structural fires currently as in years past. As there may be many reasons for this increase in firefighter casualties, one cited problem is a lack of real world experience for firefighters due to fewer occurrences of fires. While increasing the frequency of training is, of course, part of the solution, additional training alone will probably not solve all of these problems. Training inexperienced firefighters on emergency procedures and operations does not truly mimic the urgent, often confused and conflicting information present at an evolving emergency scene.

At a typical fire, quick and efficient pump and foam system operations are a necessity and are not something to be left to chance, particularly in view of the real possibility of human error. Unfortunately, human error is most likely to occur when time is most critical, that is when the fire truck first arrives at the scene of the fire and the pump must be set up. Another factor in the effectiveness of fire suppression is that the size of fire-fighting crews has been noticeably downsized in recent years, due in part to economic conditions. In some areas, fire-fighting crews that previously included 4, 5 or 6 firefighters have been reduced to only 2 or 3 individuals in recent years. Due to such manpower decreases, each firefighter must be as effective and as efficient as possible. It is often the case that the initial actions of the fire-fighting crew on the scene of a fire can determine the entire success or failure of the operation. Therefore, removing non-value added tasks and the associated opportunities for defect or error can be a real improvement in the effectiveness of firefighters.

Conventional fire trucks or other fire suppression systems include a fire pump panel that allows a firefighter to select the exact system parameters for which to fight the fire, such as pump speed and pressure, foam type and foam-to-water ratio. In operation, the firefighter is required to independently select the pump pressure or speed, then independently select the foam type, turn the foam on to release the foam into the water flow, and finally select the desired foam percentage in relation to the water flow. As is well known by those skilled in the art, this process can be relatively time consuming in an emergency and may prevent the firefighter from focusing on more critical needs. Also, this multiple selection process provides an opportunity for human error in selecting the wrong operating settings, especially if the firefighter is relatively inexperienced and is facing high stress due to the emergency situation.

While industry testing and anecdotal experience has shown that foam and a compressed air foam system (CAFS) shorten fire suppression times and can decrease water usage and physical stress on firefighters, the increased workload at the pump operator panel can be problematic. For instance, compressed air foam streams that are inappropriately adjusted at the pump operator panel can be less effective, and can even place the fire suppression team at greater risk if the output fire suppression stream has too little water content. Accordingly, the set up and operation of firefighting systems on a fire truck may be a source of error or problems that can have an impact on fire suppression and operator safety.

Referring to FIG. 1, a conventional pump control panel for fire suppression systems, generally designated 61 is shown. With such conventional pump controls the user or firefighter specifically select at least three separate parameters before beginning to extinguish the fire. For example, the conventional pump control panel 61 may include a pump pressure/speed selector 60, a separate foam type selector 62, a separate foam on/off switch 64, and a separate foam percentage selector 66. As discussed above, the process of choosing the appropriate parameters can be complicated and time consuming for firefighters during an emergency. In some instances, firefighters may completely forget to select a certain parameter, such as activating the foam on/off switch 64, resulting in a very inefficient and unproductive fire suppression technique. Alternatively, a user or operator may inadvertently select the wrong combination of water and foam flow, thus needlessly jeopardizing his or her own health and safety and the health and safety of others. Further, countless hours are invested each year into teaching firefighters to quickly and accurately select the appropriate parameters for a given fire. However, despite this investment, firefighters continue to erroneously select the proper settings. Further, when compressed air systems are added to the foam system to create compressed air foam, which has been shown to be more effective at extinguishing fires than foam systems, operation of the system becomes even more complex because the operator must determine whether air injection should be on or off and must make wet vs. dry adjustments.

Therefore, it would be desirable to provide a firefighter with the opportunity to chose from at least two predetermined established conditions of flow and pressure for the water and foam to meet the specific requirements of each fire by a one-touch activated sequence.

BRIEF SUMMARY OF THE INVENTION

Briefly stated, the present invention is directed to an integrated operator interface for a fire suppression system. The fire suppression system includes an engine, a water source, a water pump, a foam system and a compressed air system. The integrated operator interface includes a control panel including a plurality of one-touch activation controls. Each one-touch activation control is configured to cause the output of a predetermined fire suppression fluid from the fire suppression system and cause a predetermined increase in engine speed resulting in an associated increase in water pump pressure. The predetermined fire suppression fluid comprising a predetermined flow of water, a predetermined type of foamant, a predetermined concentration of the predetermined type of foamant, and a predetermined flow of compressed air.

In a further aspect, the present invention is directed to a fire suppression system comprising a foam proportioning system that includes at least two types of chemical foamants, a selector valve for selecting one of the at least two types of chemical foamants, a foam pump in fluid communication with the selector valve for supplying the selected chemical foamant to a discharge unit, and a foam controller operatively connected to the foam pump and the selector valve. The fire suppression system further comprises a water source connected to the foam proportioning system for mixing water with the selected chemical foamant to form a foamant mixture, a compressor system including an air compressor and an air ratio control throttling valve, and a system controller operatively connected to the foam proportioning system, water source and air compressor. The compressor system is configured to inject compressed air into the foamant mixture for forming a predetermined compressed air fire suppression fluid composition. The system controller includes a one-touch activation control for activating (i) the foam controller to configure the foam pump and the selector valve, (ii) the compressor system to configure the air ratio control throttling valve, and (iii) the water source to provide a predetermined water flow, in order to establish the predetermined compressed air fire suppression fluid composition.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
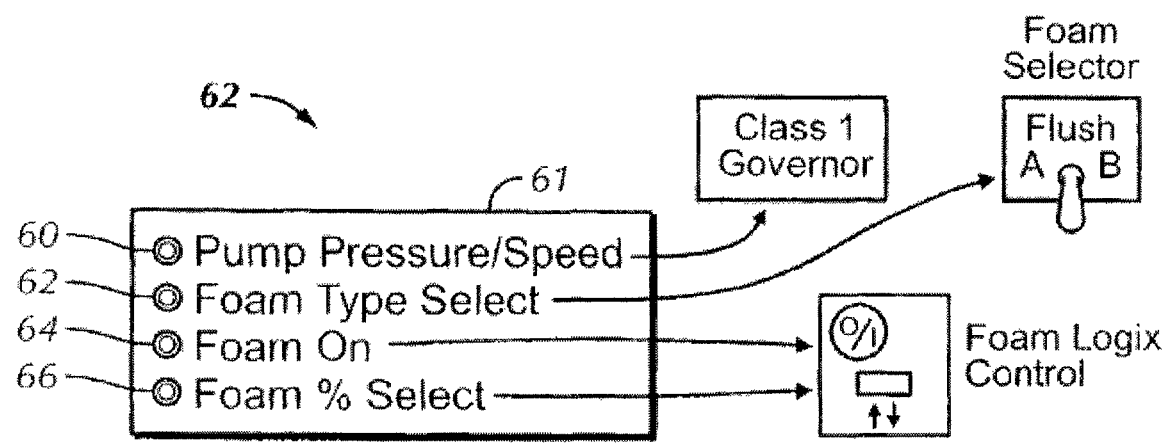
FIG. 1 is a schematic block diagram of a conventional pump control panel for a prior art fire suppression system.

Certain terminology is used in the following description for convenience only, and is not limiting. The words "right," "left," "upper," and "lower" designate directions in the drawings to which reference is made. The words "inwardly" and "outwardly" refer to directions toward and away from, respectively, the geometric center of the system and designated parts thereof. The terminology includes the words above specifically mentioned, derivatives thereof, and words of similar import.

Figure 2:
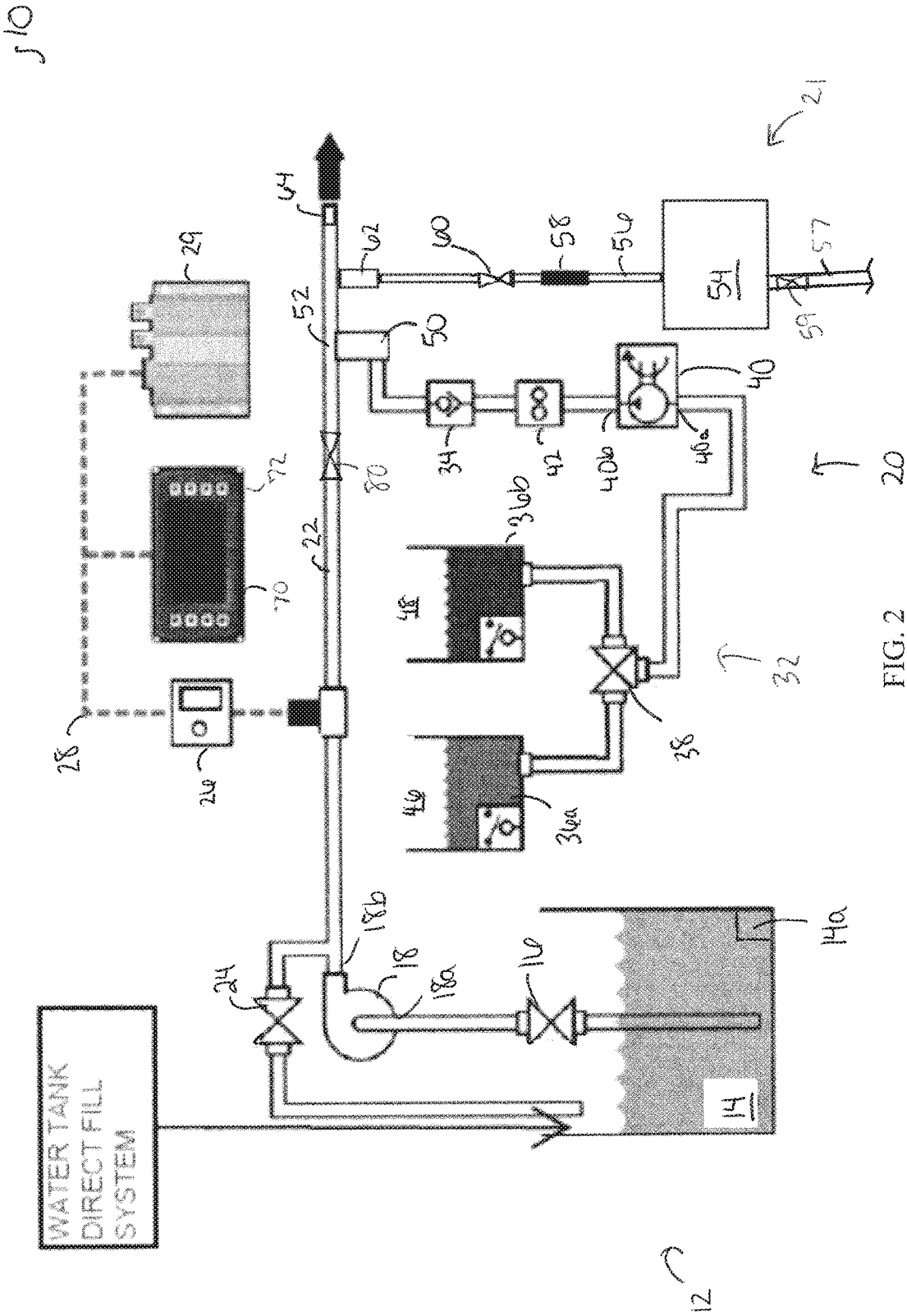
FIG. 2 is a schematic block diagram of a fire suppression system in accordance with a preferred embodiment of the present invention.

Referring to the drawings in detail, wherein like numerals indicate like elements throughout, there is shown in FIG. 2 a preferred embodiment of a fire suppression system, generally designated 10, having a plumbing assembly 12 including a water source (preferably a water tank) 14, a level sensor 14a for sensing the contents of the water tank 14, a water pump 18, a tank-to-pump valve 16 which controls the flow of water out of the water tank 14 to the water pump 18. The water pump 18 is in fluid communication with the water tank 14 and includes an input 18a and an outlet 18b. The pump outlet 18b is in fluid communication with a compressed air foam system 20, a discharge conduit 22 and a tank fill valve 24. The tank fill valve 24 is located downstream of the water pump 18 and is in fluid communication with an inlet to the water tank 14 to control the flow of water from the water pump 18 to the water tank 14 for filling the tank 14.

In general, the plumbing assembly 12 is capable of being connected to a positive water pressure supply (not shown), such as a conventional fire hydrant, to supply water to the plumbing assembly 12, which in turn is used to extinguish or suppress a fire. More particularly, in operation, a firefighter or other user connects a first end of a water supply hose (not shown) to the water supply (e.g., a fire hydrant) and a second end of the water supply hose to the plumbing assembly 12. The plumbing assembly 12 can be located within a fire truck (not shown). However, it will be understood by those skilled in the art that the plumbing assembly 12 can be located outside of the fire truck or even completely separate from the fire truck.

It will understood by those skilled in the art that the plumbing assembly 12 is not limited to the inclusion of each component described above or below, but may be modified to include additional or fewer components without departing from the spirit and scope of the present invention.

Figure 3:
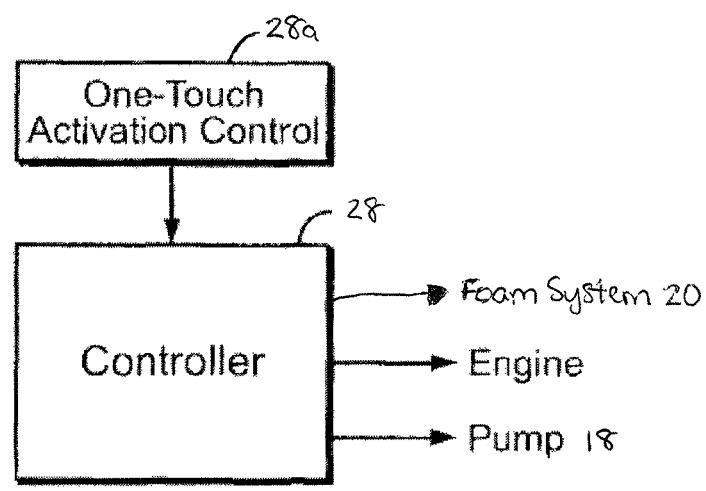
FIG. 3 is a schematic block diagram of a controller in accordance with the fire suppression system of FIG. 2.

The fire suppression system 10 also includes an engine (not shown), a transmission (not shown), a pump sensor module 26, an operator interface 70 (preferably in the form of a control panel 72), a pump motor driver 29, and a controller 28. The engine is operatively connected to the water pump 18 for driving or powering the water pump 18, as well as for powering the fire truck, if so configured. The controller 28 can be any conventional controller, such as a computer or logic control system (e.g., a UV700 EsKey system by Hale Products, Inc., of Ocala, Fla., 34475, a SAE J1939 vehicle bus, or a controller area network or wiring (CAN bus)) and is schematically shown in FIG. 3. The operator interface 70 is operatively connected to at least the engine and the water pump 18.

Figure 5:
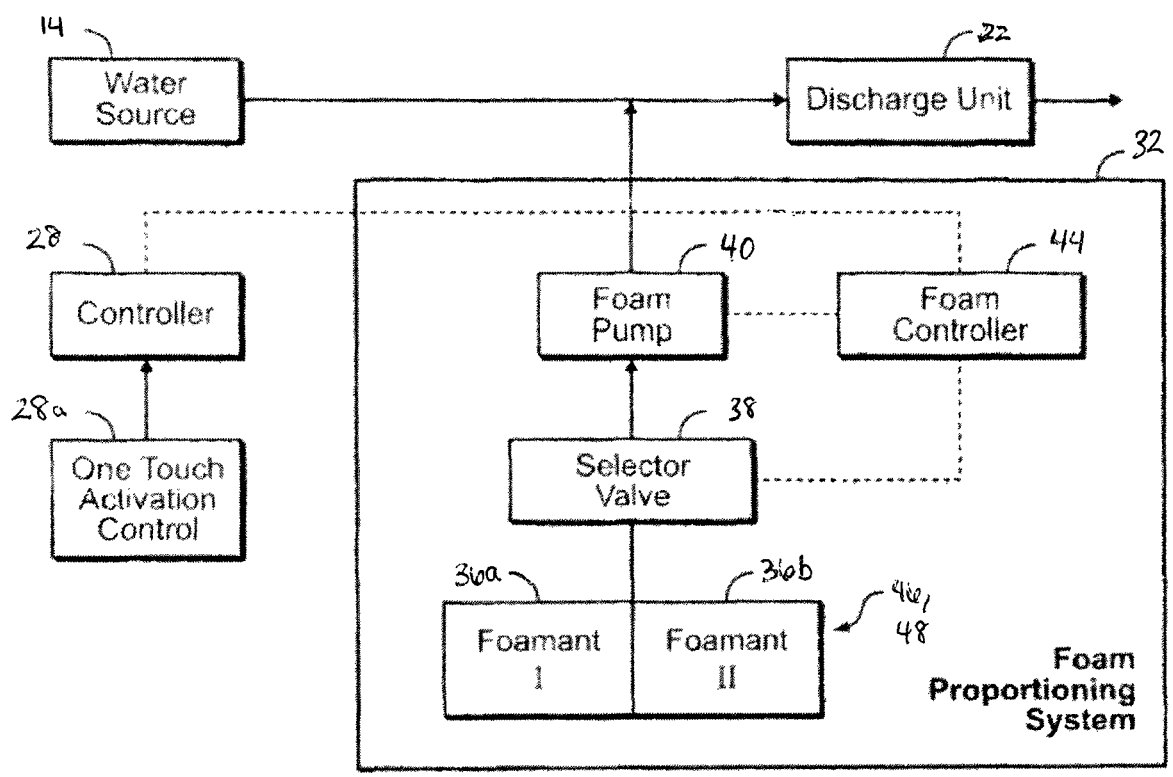
FIG. 5 is another schematic block diagram of the fire suppression system of FIG. 2.

The fire suppression system 10 can be automatically configured to output a predetermined fire suppression fluid composition utilizing the compressed air foam system 20. The compressed air foam system 20 includes a foam system 32, and more particularly a foam proportioning system 32. The foam proportioning system 32 includes at least two chemical foamants 36a, 36b, a selector or switch valve 38, a foam pump and motor 40, a foam flowmeter 42, an injection check valve 34 and a foam controller 44 (FIG. 5). The two chemical foamants 36a, 36b may be stored in separate first and second foam tanks 46, 48, respectively, or within different compartments of a single tank. The selector valve 38 is in fluid communication with the first and second foam tanks 46, 48 for selecting one of the at least two types of chemical foamants 36a, 36b. The foam pump 40 includes an input 40a in communication with the selector valve 38 and an output 40b in fluid communication with the outlet 18b of the water pump 18 through the discharge conduit 22. More particularly, the foam pump 40 receives an input of a selected foamant 36a, 36b from the selector valve 38 and pumps the selected foamant 36a, 36b through check valve 34 to a foam injection port 50 which is in fluid communication with the discharge conduit 22 and the output 18b of the water pump 18. As such, the selected foamant 36a, 36b combines with the water outputted from the water pump 18 at a juncture 52 in the discharge conduit 22. The foam controller 44 is operatively connected to the controller 28, the foam pump 40, and the selector valve 38 (FIG. 5).

The fire suppression system 10 further includes a compressed air system 21 comprising an air compressor 54 which is operatively coupled to a power source (not shown), such as an engine (e.g., the fire truck engine), a gas or diesel power plant, an electric motor or hydraulic drive system, or power take-off drive from a gear box or the fire truck transmission. The power source provides sufficient power and speed to run the air compressor 54. The air compressor 54 typically runs at a constant speed in the compressed air foam system 20. The air compressor 54 can be a rotary compressor, a reciprocating type compressor, or other compressor as well.

The air compressor 54 includes an output conduit 56 preferably fitted with an air flowmeter 58 and an outtake valve 60 which is in fluid communication with an air injection port 62, and an intake conduit 57 preferably fitted with an intake throttling valve 59. The air injection port 62 is in fluid communication with the discharge conduit 22 and provides for the optional injection of compressed air into the discharge conduit 22 downstream from the junction 52 at which the water combines with the selected foamant 36a, 36b. The air compressor intake throttling valve 59 allows the control of the air discharge pressure from the air compressor 54, and more particularly, varies the flow of air being discharged from the air compressor 54 and injected into the discharge conduit 52 via an air injection port 62. An air ratio control valve 80, located downstream of the water pump 18 and upstream of the foam injection port 50, juncture 52 and the air injection port 62, varies the fluid (i.e., the foam solution) flow rate to allow very dry foam to be made, as may be required. Preferably, the air ratio control valve 80 is connected to the control system (i.e., operator interface 70) via the CAN bus 28. The compressed air injected into the discharge conduit 52 via the air injection port 62 combines with the water and selected foamant 36a, 36b to produce a foam, and more particularly a compressed air fire suppression fluid, in the discharge conduit 52. Preferably, a hose (not shown) is attached to the output of the discharge conduit 52 for directing the compressed air fire suppression fluid onto a desired area (e.g., a fire).

The fire suppression system 10 further preferably includes a check valve (not shown) downstream from the water pump 18 and upstream of the foam injection port 50 to prevent the selected chemical foamant 36a, 36b from back flowing into the water tank 14.

The discharge conduit 22 preferably includes a static or motionless mixer 64 for agitating the mixture of water and selected chemical foamant 36a, 36b for formation of the compressed air suppression fluid. The static mixer is preferably provided downstream the foam injection port 50.

The integrated operator interface 70 (see FIGS. 6-20) is preferably operatively connected to the controller 28 for controlling the engine, plumbing assembly 12 and the foam proportioning system 20. The integrated operator interface 70 includes a control panel 72. In one embodiment, the integrated control interface 70 is a graphical user interface (GUI) and the control panel is a touchscreen display screen 72. The GUI provides access to the graphics being displayed on a touchscreen display 72, such that a user can access, view and control the status of the fire suppression system 10. In one embodiment, the controller 28 and associated software are preferably integrated into the GUI and provide CAN and direct wired connections to control the system 10. Additional CAN-based modules may be used to distribute control throughout the system 10. Such modules preferably would meet SAEJa939 and are known in the art. An example of such a module is the Class1 EsKey system. Further, it will be understood that the integrated control interface 70 need not be a touchscreen GUI, but rather may be a display panel including push buttons, switches, etc. and interchangeable placards or labels.

Figure 4:
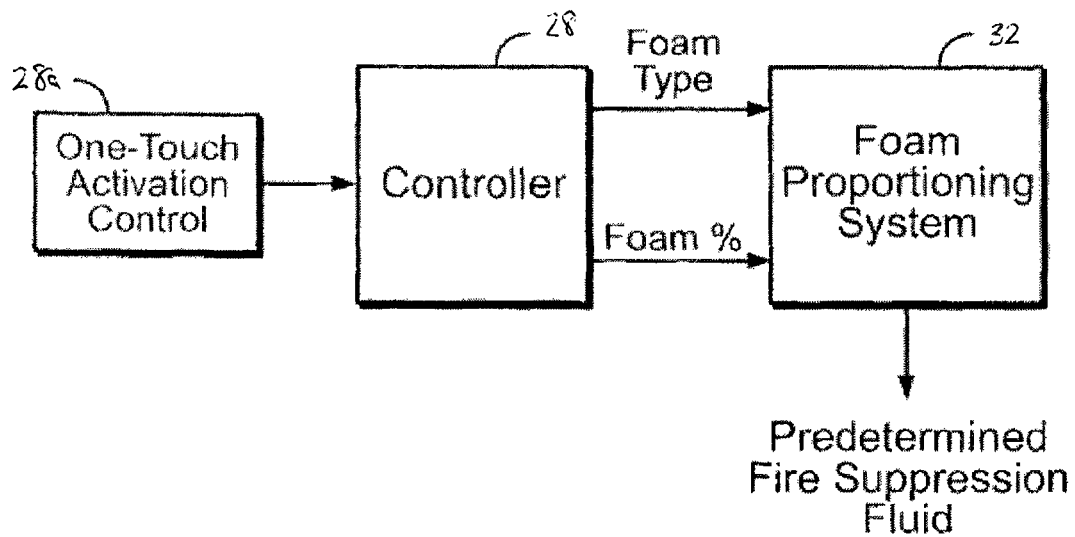
FIG. 4 is another schematic block diagram of the controller in accordance with the fire suppression system of FIG. 2.
Figure 13A:
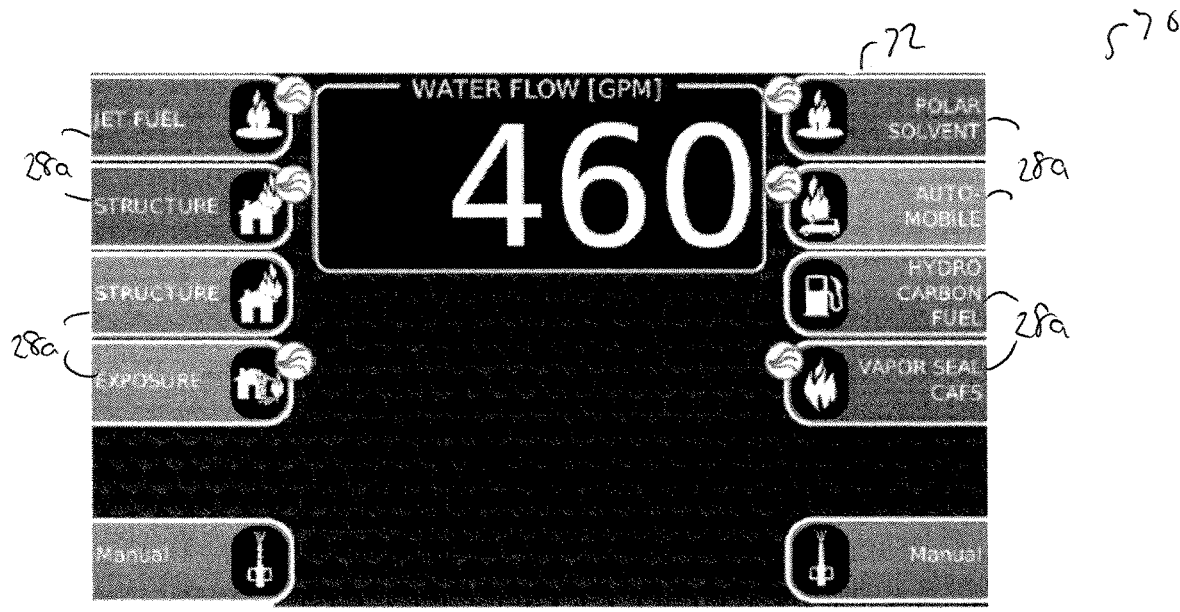
FIGS. 13A-13C are screenshots of a user start page of the integrated operator interface; and, FIGS. 14-20 are screenshots of an operations page of the integrated operator interface.
Figure 13B:
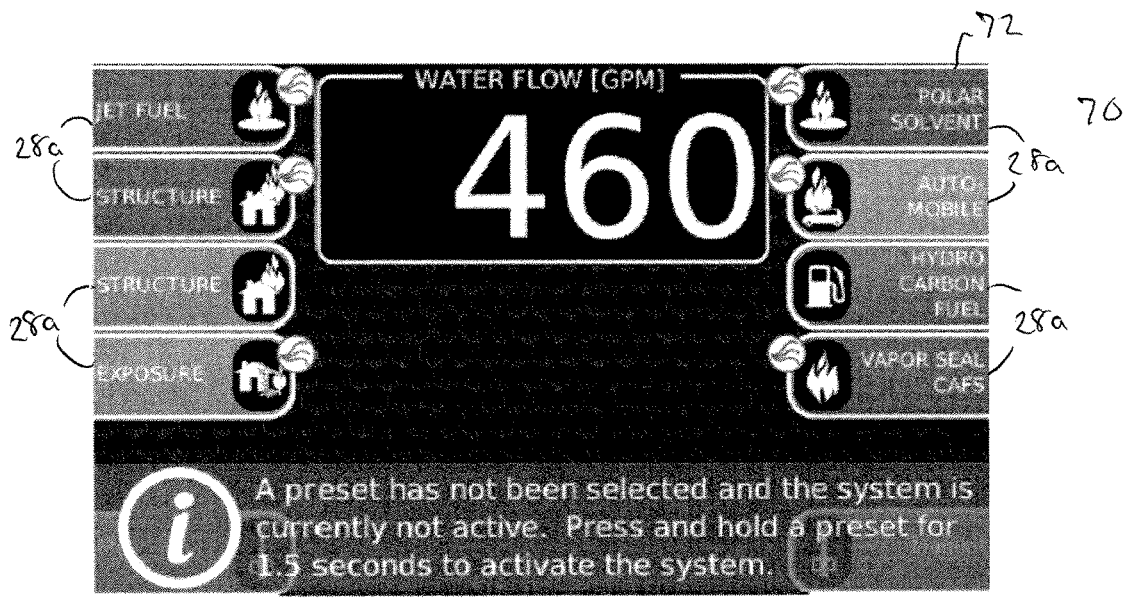
Figure 13C:
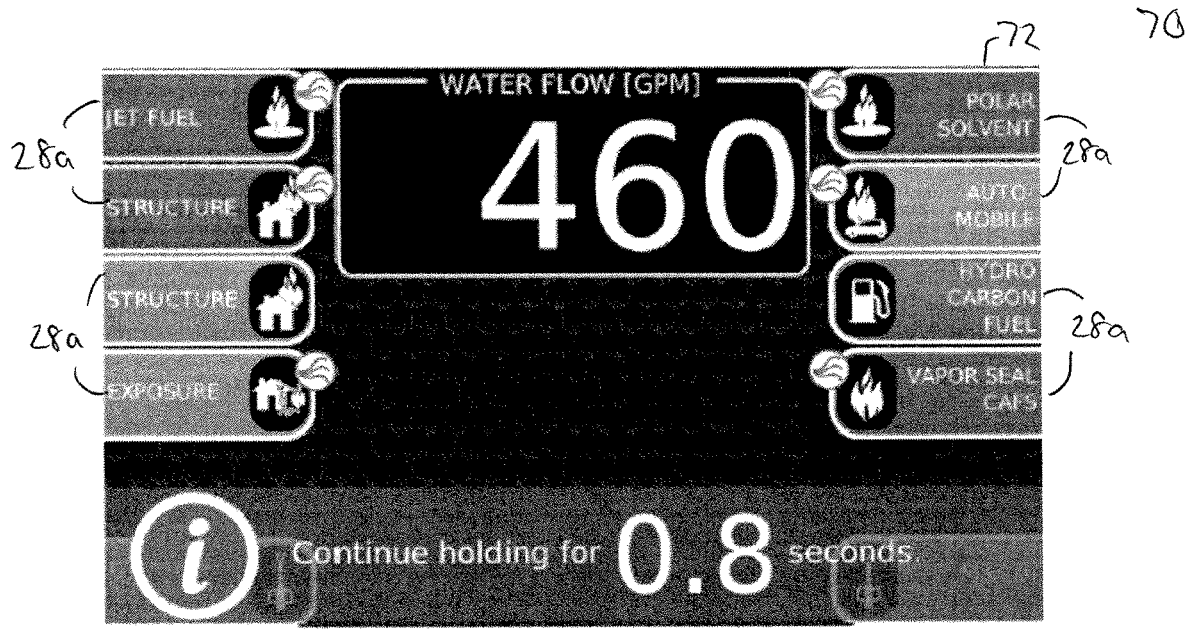

As shown in FIGS. 13A-13C, the GUI 70 preferably includes at least one one-touch activation control 28a, and more preferably a plurality of one-touch activation controls 28a, for activating the controller 28. Each activation control 28a is preferably represented by an icon or symbol to indicate a particular fire suppression fluid, as defined by a predetermined combination of various parameters, such as flow, air concentration, pressure and foam concentration, to be output by the system 10. In response to the actuation of one of the activation controls 28a, the controller 28 is configured to automatically open or close the tank-to-pump valve 16 to establish a predetermined water flow and to output to the foam controller 44 inputs for configuring the foam pump 40 and selector valve 38 to establish the predetermined fire suppression fluid composition. An overall schematic diagram of the function of the controller 28 as related to the compressed air foam system 20 is shown in FIGS. 4-5.

The GUI 70 allows an authority having jurisdiction (AHJ), such as a fire department management entity, to program the GUI to preset the different activation controls 28a, each of which represents a different type of fire (e.g., a trash or brush fire, a structural fire, a car fire, a flammable hydrocarbon liquid fire, a flammable polar solvent fire, and an exposure fire), and each of which is associated with a predetermined fire suppression fluid configured to suppress the represented type of fire. The composition and output of the predetermined fire suppression fluid is based upon many different parameters including, but not limited to, the type of foamant 36a, 36b, engine speed, pump pressure, foam concentrate or percentage, whether or not the air compressor 54 is in operation, whether or not compressed air is injected into the discharge conduit 22, flow of water from the water tank 14, the type of compressed air (e.g., wet, medium, dry or any intermediate thereof), operation of a safety interlock for controlling the air injection, the amount of air injection, and the like. As such, each predetermined fire suppression fluid preferably comprises a predetermined flow of water, a predetermined type of foamant, a predetermined concentration of the predetermined type of foamant, and a predetermined flow of compressed air.

The various types of chemical foamants applicable to the present invention are well known in the art and a detailed description of such chemical foamants is not necessary for a complete understanding of the present invention. In general, different combinations of such parameters result in predetermined fire suppression fluid compositions configured to suppress different types of fires.

Figure 6:
FIGS. 6-8 are screenshots of a preset configuration menu page of an integrated operator interface for the fire suppression system of FIG. 2.

Programming or modification of the interface 70 begins at a home or main menu page presented on the display screen 72, an exemplary screenshot of which is shown in FIG. 6. Preferably, on the main menu page, the GUI displays a keypad 74 of numbers, letters and/or symbols requiring the AHJ to enter a password for accessing one of various available pages. Preferably, the password keypad 74 appears only when the foam system 20 and air compressor 54 are not in operation.

For programming of the interface 70, multiple different input pages are available, namely a preset configuration menu page (exemplary screenshots shown in FIGS. 6-8), a user configuration page (exemplary screenshot shown in FIG. 9), an original equipment manufacturer (OEM) page (exemplary screenshot shown in FIG. 10), a factory settings page (exemplary screenshot shown in FIGS. 11A-11B), and a calibration menu page (exemplary screenshot shown in FIGS. 12A-12G). Each page is accessible by entry of a different password using the password keypad.

Figure 7:
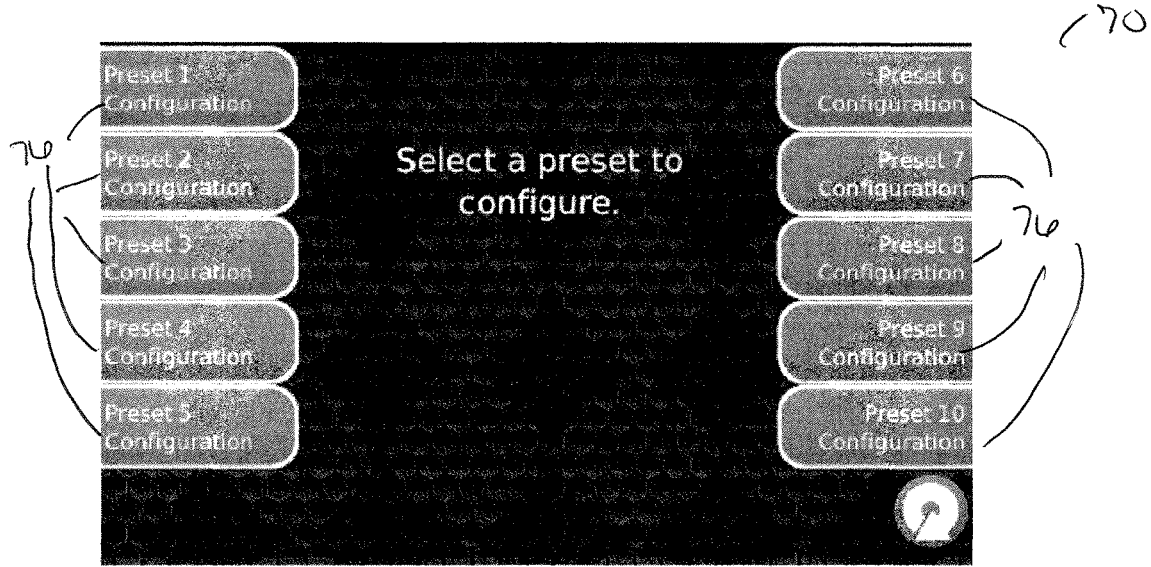

The preset configuration menu page preferably includes at least one generic icon 76, and more preferably a plurality of generic icons 76, each of which represents a one-touch activation control 28a and enables the AHJ to preset that activation control 28a with various parameters for outputting a predetermined fire suppressions fluid composition. For example, as shown in FIG. 7, each generic icon 76 may be identified as "Preset # Configuration."

Figure 8:
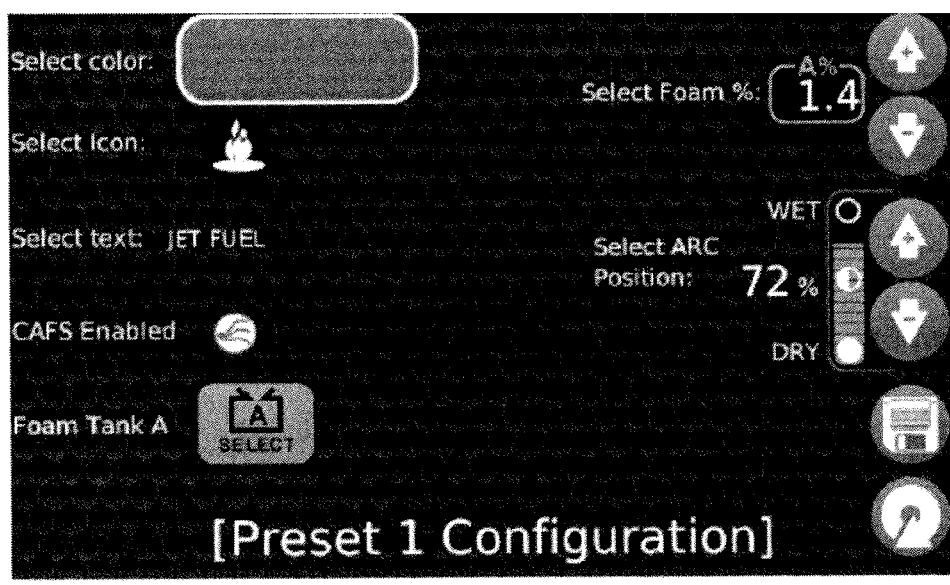

From the preset configuration menu page, once the AHJ selects a particular icon 76 to be programmed, the GUI 70 displays an individual preset configuration page, an exemplary screenshot of which is shown in FIG. 8. On the individual preset configuration page, the touchscreen display 72 of the GUI 70 presents the AHJ with various parameters for which the AHJ may manually enter data or select from a plurality of pre-programmed options. For example, in one embodiment, the individual preset configuration page prompts the AHJ to manually enter or select the following for the icon to represent a particular activation control 28a: a representative color, a representative image, descriptive text, whether or not the compressed air system should be enabled, the chemical foamant, the foamant concentration and the type of compressed air suppression fluid to be generated.

Figure 9:
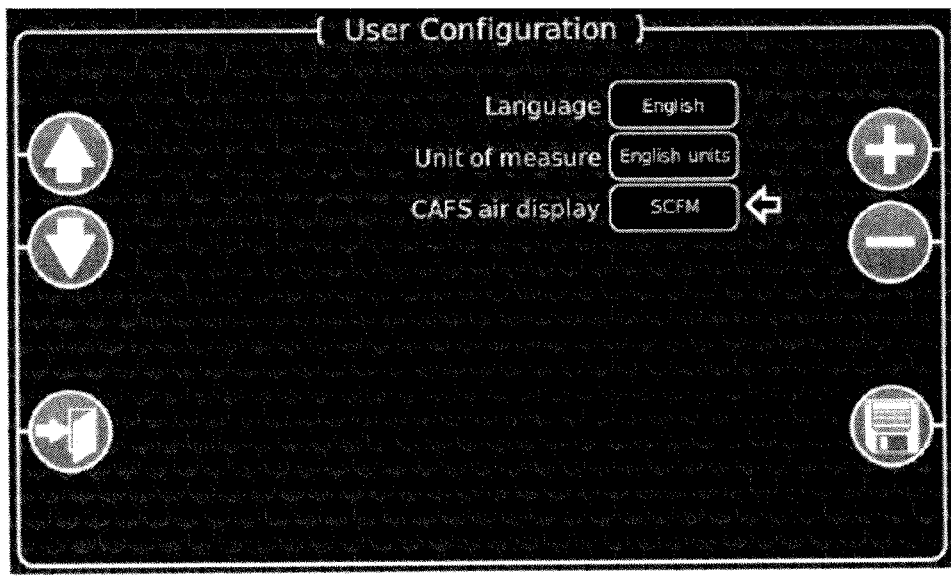
FIG. 9 is a screenshot of a user configuration page of the integrated operator interface.
Figure 10:
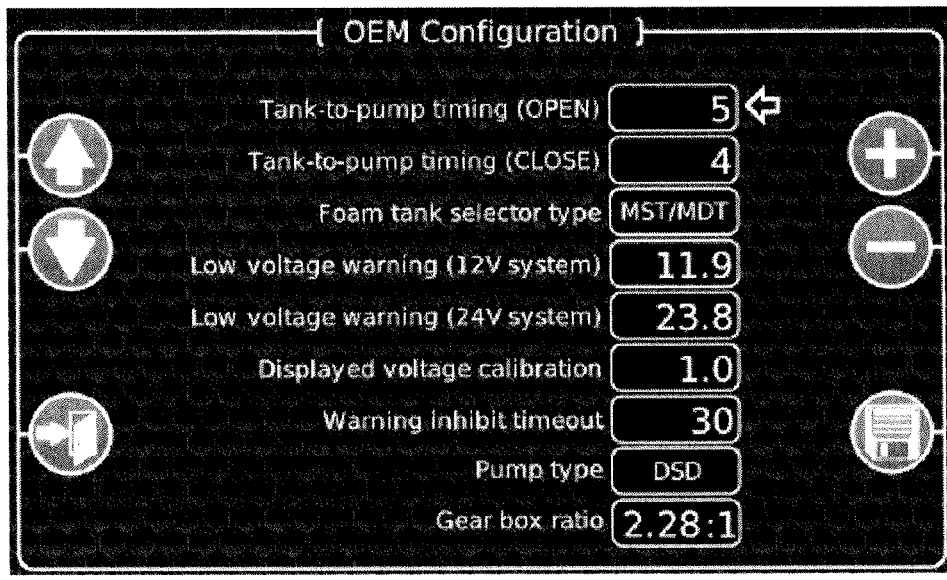
FIG. 10 is a screenshot of an original equipment manufacturer (OEM) page of the integrated operator interface.
Figure 11A:
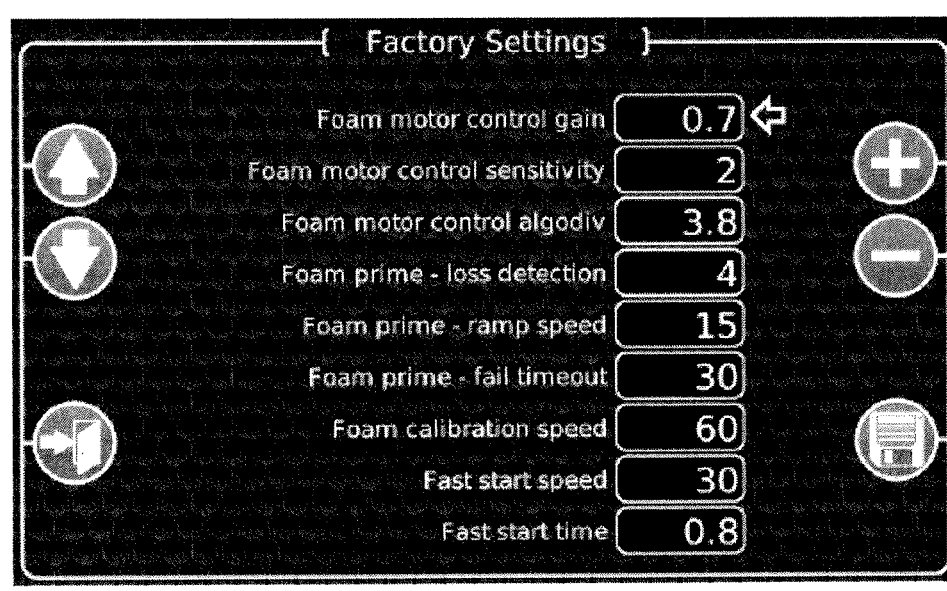
FIGS. 11A-11B are screenshots of a factory settings page of the integrated operator interface.
Figure 11B:
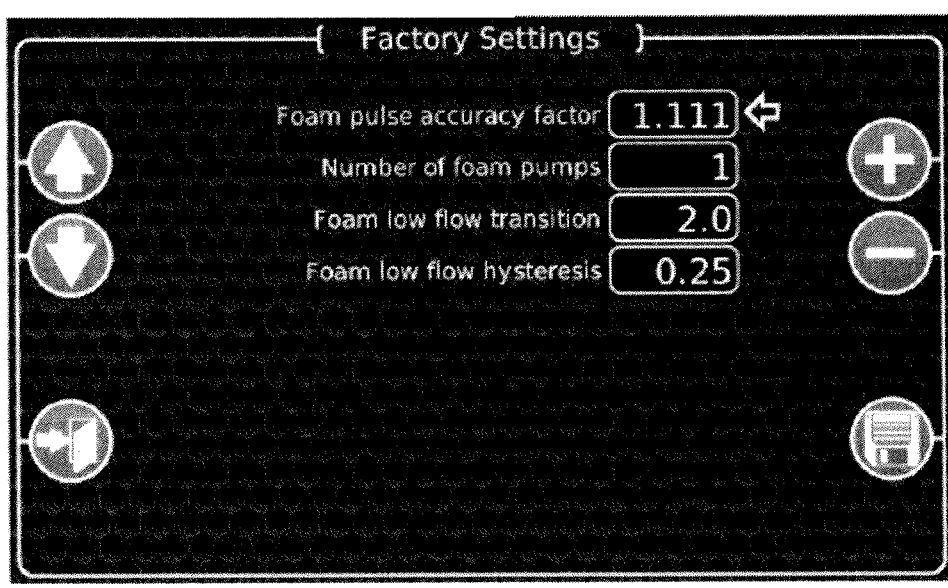

The user configuration page enables the AHJ to program top-level parameters of the integrated control interface 70. For example, as shown in FIG. 9, the user configuration page enables the AHJ to select or manually enter a desired language and desired units of measure. The OEM configuration page enables the AHJ to program parameters such as the timing for opening and closing of the tank-to-pump valve 16, the foam tank selector type, thresholds for low voltage and timeout warnings, voltage calibration, pump type, gear box ratio and the like (see FIG. 10). The factory settings page enables the AHJ to program the interface 70 for system-related parameters, such as foam motor control gain, foam motor control sensitivity, loss detection, ramp speed, fail timeout threshold, foam calibration speed, the number of foam pumps, and the like (see FIGS. 11A-11B).

Figure 12A:
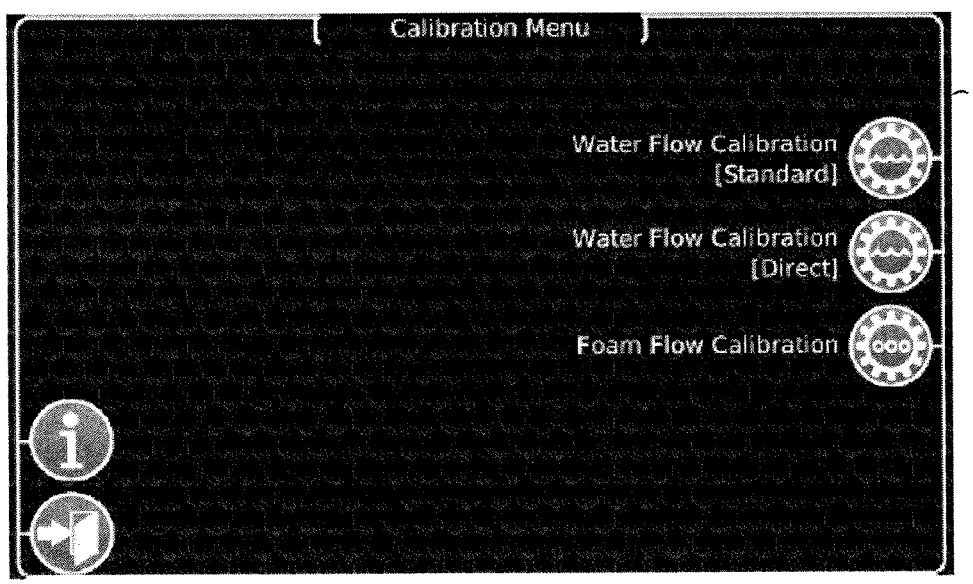
FIGS. 12A-12G are screenshots of a calibration menu page of the integrated operator interface.
Figure 12B:
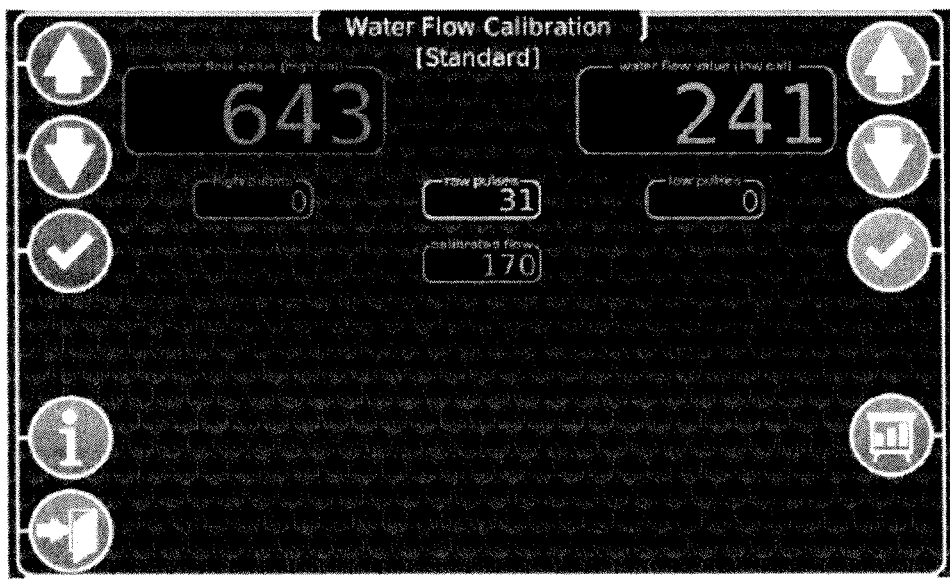
Figure 12C:
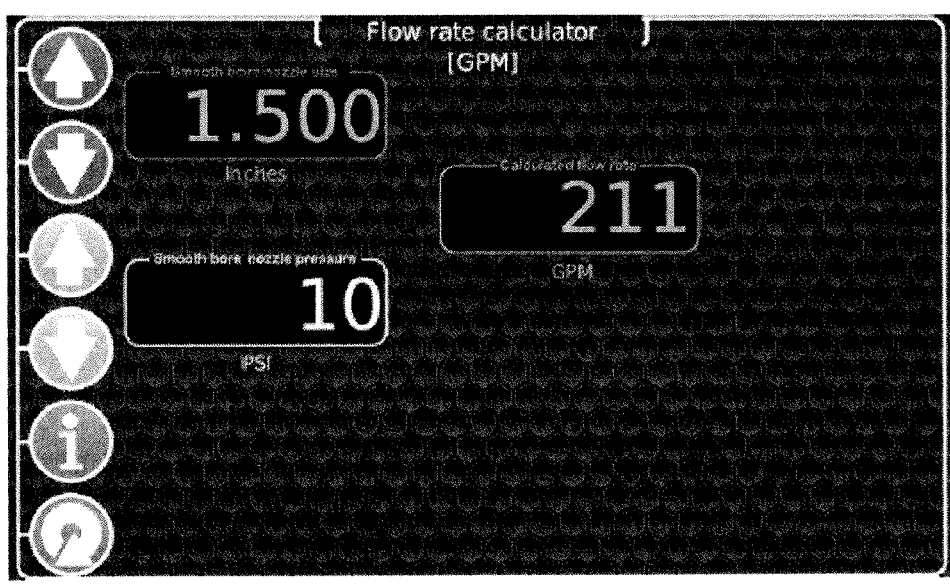
Figure 12D:
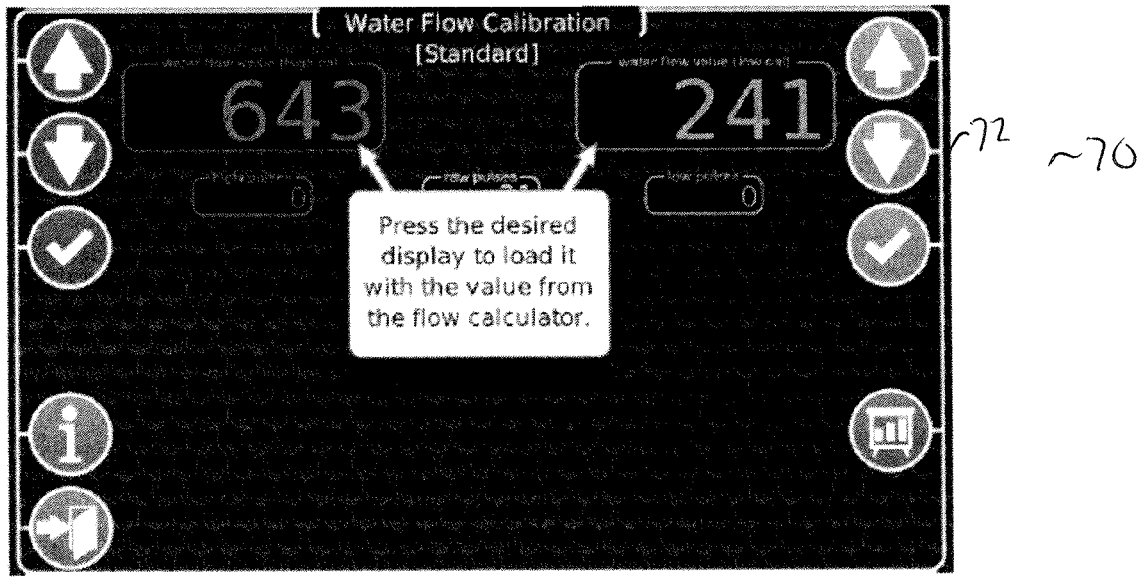
Figure 12E:
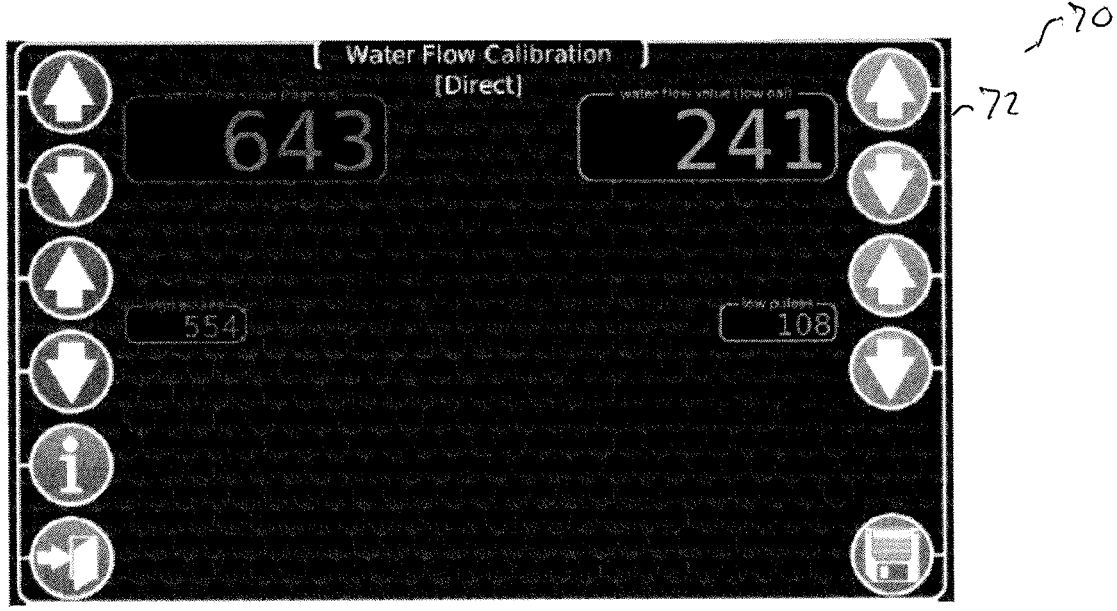
Figure 12F:
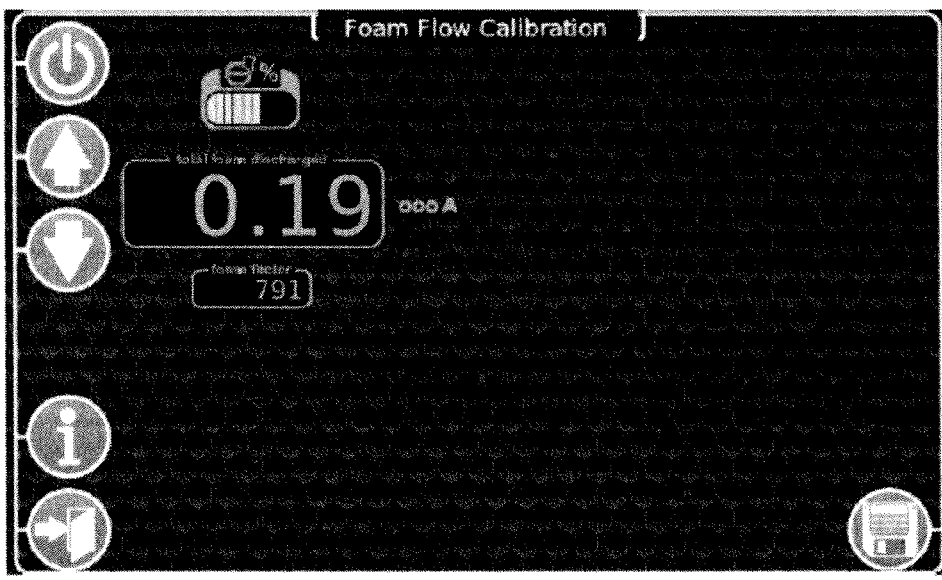
Figure 12G:
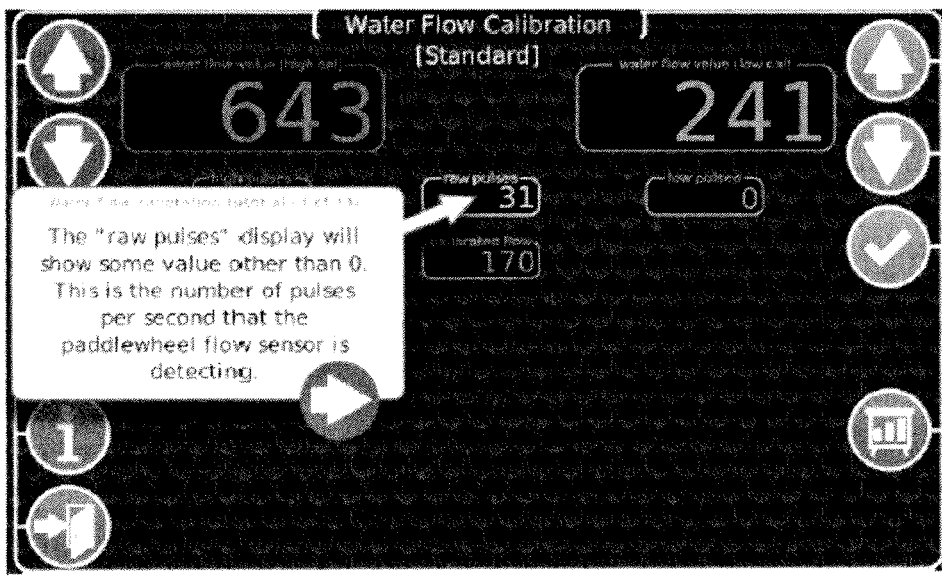

The calibration menu page utilizes a two-point calibration method (e.g., a MV module and the Dual 6.5 FoamLogix system) and allows a user to either perform a full water flow calibration or directly enter the water flow (FIG. 12A). For the full water flow calibration, referred to in the calibration menu page as "Water Flow Calibration [Standard]" (see FIGS. 12B-12D), actuation (i.e., by touching) of the chart icon triggers a flow rate calculator, the gallons per minute values of which change as the size and pressure values are modified by the AHJ, and the user then need only touch a water flow value window for insertion of the calculated flow rate into the selected window. For direct water flow calibration (see FIG. 12E), the user can simply enter the known water flow rate and pulse values, without having to perform a full water flow calibration. The same two-point calibration method can also be utilized for the foam flow (FIG. 12F). Touching of the "i" icon on the calibration menu leads the user to a tutorial (not shown) for the calibration process (FIG. 12G).

Once programmed, the integrated control interface 70, as shown in FIG. 13A) allows the user (e.g., a firefighter) to select any and/or all of the above-identified and other fire suppression parameters with the activation of a single one-touch activation button to meet the requirements of each fire. The integrated control interface 70 is particularly beneficial because even if a firefighter fails to remember the proper operating pressure for the particular fire, he/she may simply press a single button to turn on the foam system and pump/engine to the appropriate rate and/or speed to deliver the required (i.e., pre-determined) fire suppression fluid composition at the appropriate flow rate.

Once programmed, the user start page, exemplary screenshots of which are shown in FIG. 13A, of the GUI 70 includes at least two, but preferably at least eight one-touch activation controls 28a having icons or symbols, each of which is representative of a predetermined fire suppression fluid composition. Each icon comprises a single touch button that may be touched and selected by the user or firefighter to activate the desired predetermined fire suppression fluid composition that is sufficient to suppresses a specific type of fire, such as a trash or brush fire, a structural fire, a car fire, a flammable hydrocarbon liquid fire, a flammable polar solvent fire, and an exposure fire. A brief written description section (FIG. 13A) may be included proximate the icons to provide the firefighter with a more detailed account of the combination. Furthermore, the pre-determined pressure and foam type percentages for each combination may be listed to provide the firefighter with a more accurate account of the predetermined combinations of flow and pressure.

The start page preferably further includes a display box showing the current water flow and a display box showing the current air flow (when the air compressor is on and compressed air is being injected into the discharge conduit 52). If an icon is selected, a virtual home button will toggle between the selected icon page and the start page. If an icon is not selected, the display screen 72 will prompt a user to select an icon by touching the icon for a predetermined period of time (FIG. 13B). In one embodiment, once the user touches the desired icon, the start page will display a pop-up message with a timer counting down the remaining time for which the user must hold the icon in order to start an operation associated with that icon (FIG. 13C).

Figure 14:
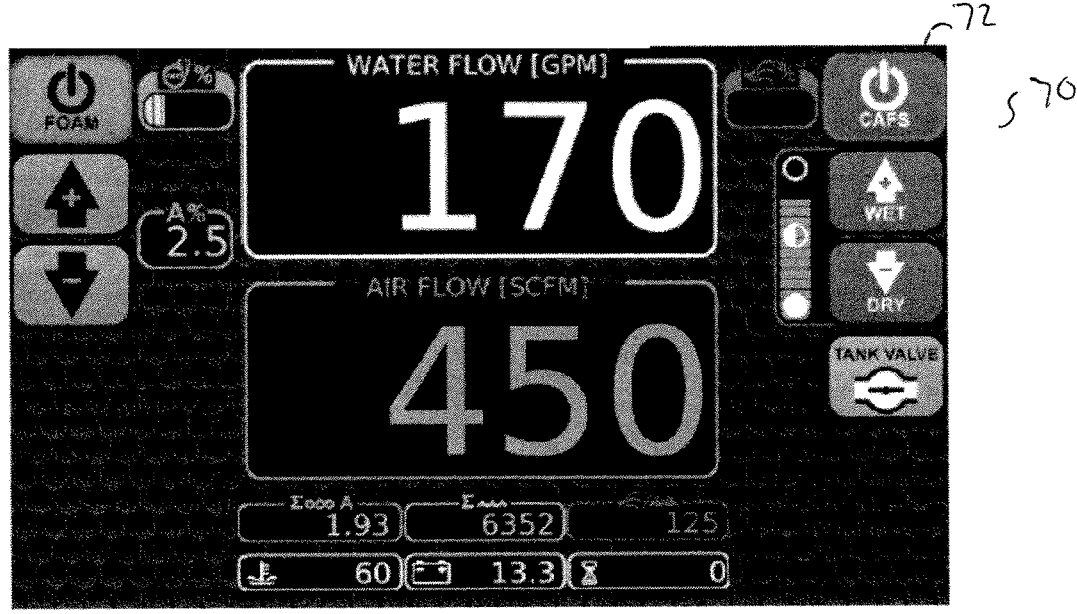
Figure 15:
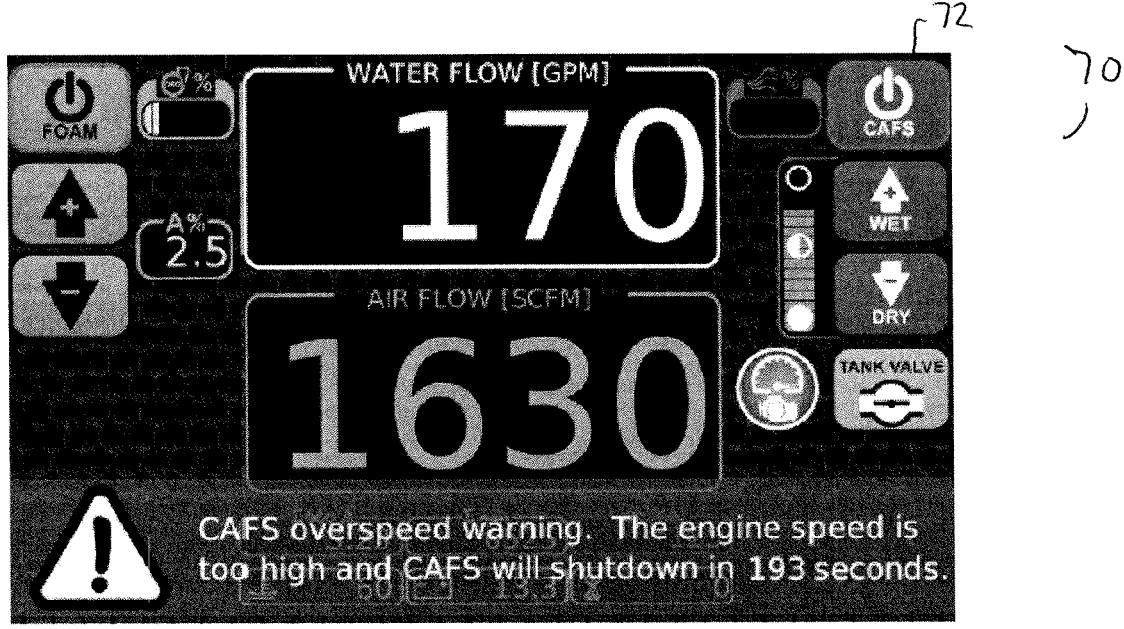
Figure 16:
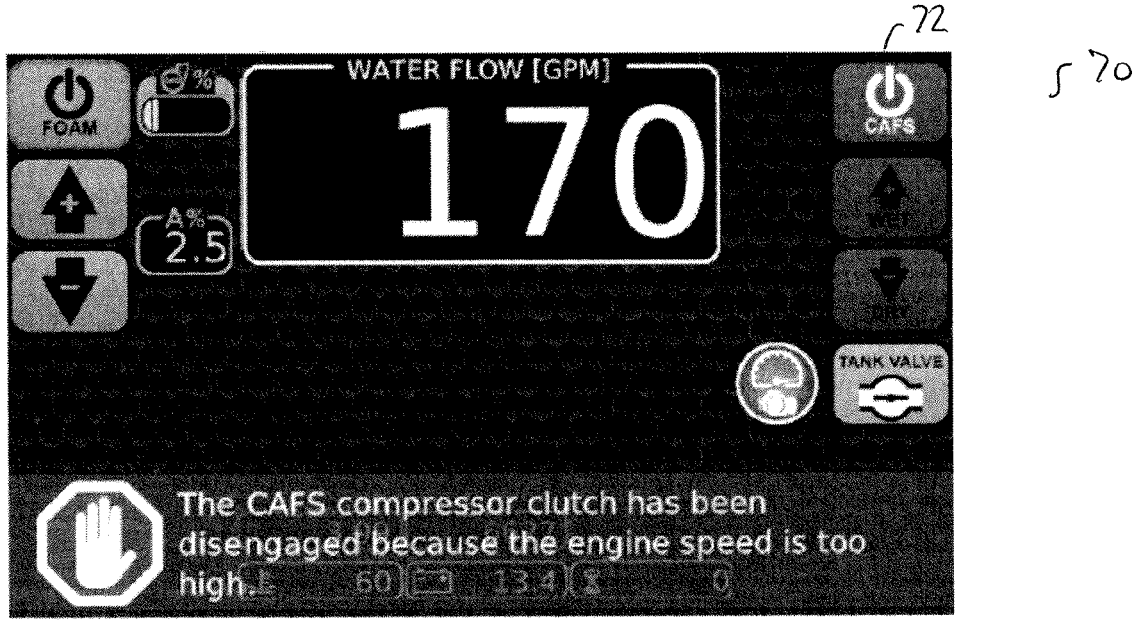
Figure 17:
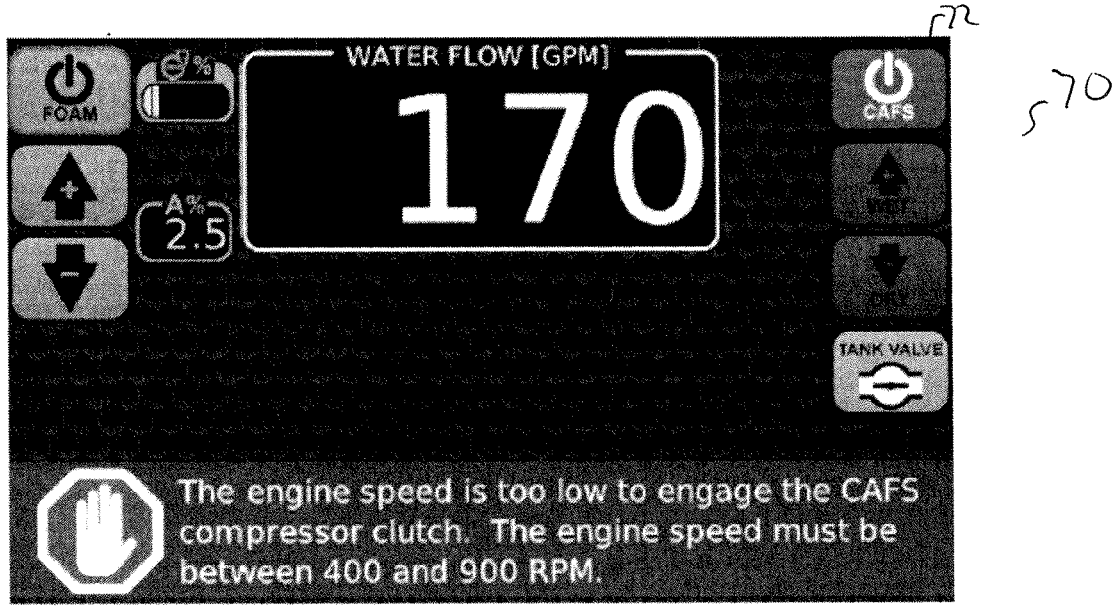
Figure 18:
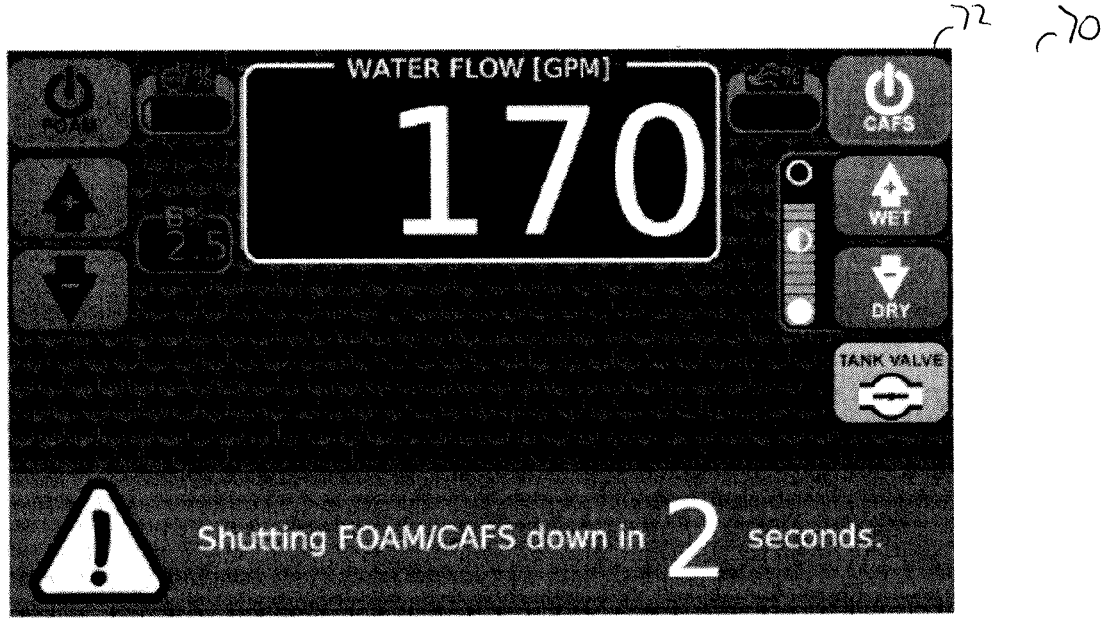
Figure 19:
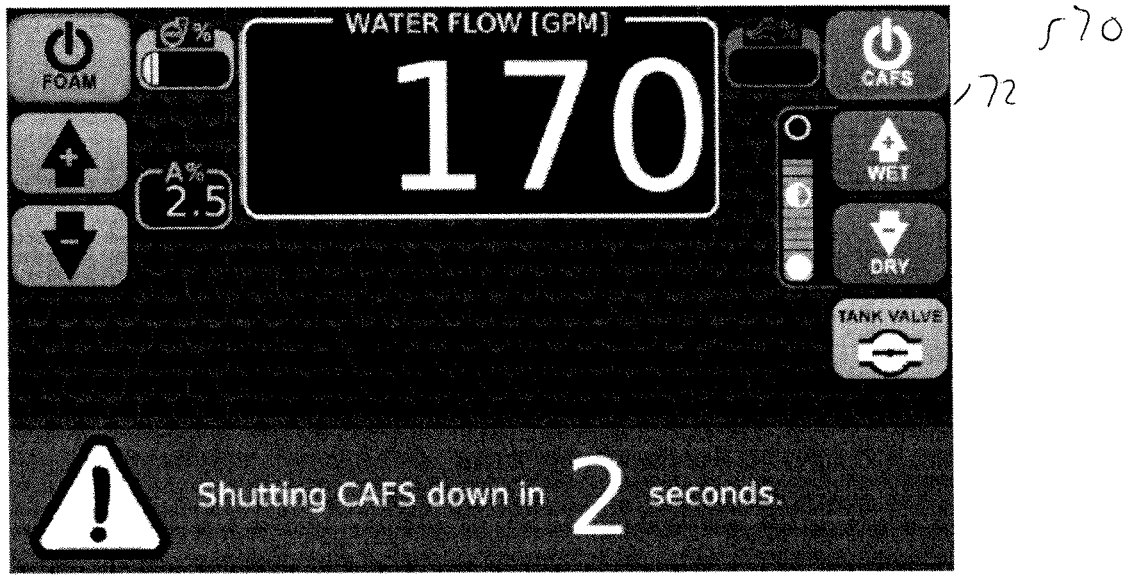

Once an icon is selected, an operation page for the selected icon, and thus the selected predetermined fire suppression fluid, is displayed on the touchscreen display 72 of the GUI 70 (FIG. 14). In addition to one or more of the above-discussed parameters, as well as the water and air flows, the operation page shows the real-time status of the tank-to-pump valve (i.e., whether it is open, closed, or in a transition state) and the air compressor 54 (i.e., whether it is on or off). The operation page is also configured to display several different warnings, such as those shown in FIGS. 15-20, related to an excessively high or low engine speed, an excessively high or low temperature, priming status of the foam pump, water tank 24 levels, foam tank 46, 48 levels, and the like. For example, FIGS. 15-17 depicts a series of warnings shown by the touchscreen display 72 when the engine speed has been detected as being excessively high or low. FIGS. 18-19 depict the warnings displayed as a user is attempting to shut down the system 10.

Figure 20:
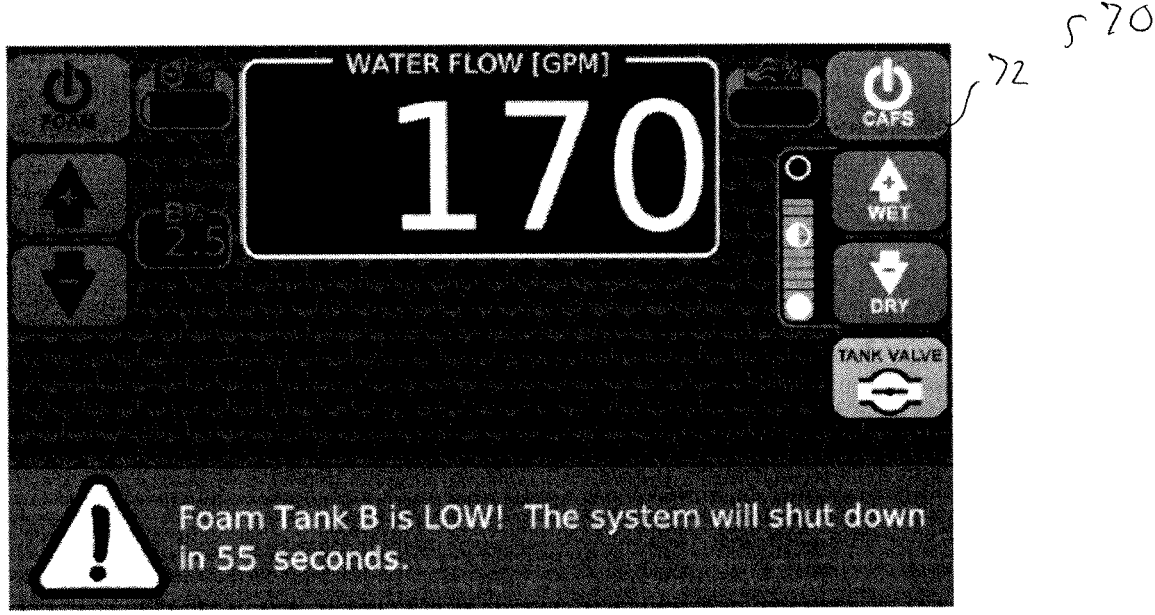

FIG. 20 depicts the warning shown when the foam tank 46, 48 level is too low. Preferably, the controller 28 is equipped to automatically maintain the levels of the water tank 14 and the foam tanks 46, 48 at predetermined thresholds by throttling the tank valves as necessary to refill the respective tanks 14, 46, 48. Preferably, such refill operations can be maintained by a user via a control on the integrated control interface 70. Further, each one-touch activation control 28*a* preferably actuates operation of the pump at a predetermined pressure and operation of the engine at a predetermined speed. The integrated control interface 70 preferably further comprises step by step instructions for a foamant flush sequence (e.g., during the switching of foamant tanks 46, 48) and tutorial instructions to assist the operator with infrequently performed tasks, such as calibration, foam tank refill, system flushing and troubleshooting.

The integrated control interface 70 preferably enables a user to control the entire system 10, including the pump 18, the engine, the transmission, and the like, such that all components of the fire suppression system 10 are controllable via the single integrated control interface 70.

It is understood by those skilled in the art that the icons of the integrated control interface 70 are not limited to the specific function described herein, but may be modified to include additional or fewer icons and/or buttons for various types of fires. Further, it is understood by those skilled in the art that the integrated control interface 70 is preferably mounted onto an exterior surface of the fire truck 32 to allow the firefighter to quickly and conveniently activate the desired combination. However, it is understood by those skilled in the art that the integrated control interface 70 may be located virtually anywhere on or within the fire truck 32, such as inside the driver's cabin, without departing from the broad inventive concept thereof.

Preferably, the various icons of the integrated control interface 70 are located within an aesthetically pleasing depiction of a top plan view of a conventional fire truck 40. However, those skilled in the art would understand that the depiction may be modified without departing from the broad inventive concept thereof. For example, the icons of the integrated control interface 70 may be arranged in any configuration or may be of any size without departing from the spirit and scope of the present invention.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined by the appended claims.

We claim:

1. An integrated operator interface for a fire suppression system comprising an engine, a water source, a water pump, a foam system and a compressed air system, the integrated operator interface comprising:
a control panel including a plurality of one-touch activation controls, each one-touch activation control being configured to cause the output of a predetermined fire suppression fluid from the fire suppression system and cause a predetermined increase in engine speed resulting in an associated increase in water pump pressure, the predetermined fire suppression fluid comprising a predetermined flow of water, a predetermined type of foamant, a predetermined concentration of the predetermined type of foamant, and a predetermined flow of compressed air.

2. The integrated operator interface of claim 1, wherein the control panel comprises a touch screen display.

3. The integrated operator interface of claim 1, wherein the control panel is a graphical user interface.

4. The integrated operator interface of claim 1, wherein the control panel displays a state of an air compressor which supplies the compressed air.

5. The integrated operator interface of claim 1, wherein the control panel displays a state of a control valve which controls the supply of the water from the water source.

6. The integrated operator interface of claim 1, wherein the predetermined fire suppression fluid is a compressed air foam fluid of a type selected from the group consisting of wet, dry, medium, and any intermediate thereof.

7. The integrated operator interface of claim 1, wherein the water source is a water tank and the integrated operator interface includes a control for maintaining the water tank at a predetermined level.

8. The integrated operator interface of claim 1, wherein the integrated operator interface includes a control for maintaining a foamant tank which supplies the foamant at a predetermined level.

9. The integrated operator interface of claim 1, further comprising step by step instructions for a foamant flush sequence.

10. The integrated operator interface of claim 1, further comprising tutorial instructions for at least one task selected from the group consisting of calibration, foam tank refill, system flushing and troubleshooting.

11. The integrated operator interface of claim 1, wherein the predetermined fire suppression fluid is established to suppress a fire type selected from the group consisting of a trash/brush fire, a structural fire, a car fire, a flammable hydrocarbon liquid fire, a flammable polar solvent fire, and an exposure fire.

12. The integrated operator interface of claim 11, wherein the one-touch activation control includes a symbol that corresponds to the predetermined fire suppression fluid.

13. The integrated operator interface of claim 12, wherein the symbol is selected from the group consisting of a trash can, a fuel station, a flame, an automobile, a building, and an exposure.

\* \* \* \* \*